REMOTE INPUT UNIT FOR DATA PROCESSING SYSTEM

Filed Aug. 29, 1958

INVENTOR.
LA VERNE E. RICKARD

BY Richard E. Cummins

ATTORNEY

United States Patent Office
2,995,726
Patented Aug. 8, 1961

2,995,726

REMOTE INPUT UNIT FOR DATA PROCESSING SYSTEM

La Verne E. Rickard, San Jose, Calif., assignor to International Business Machines Corporation, New York, N.Y., a corporation of New York Filed Aug. 29, 1958, Ser. No. 758,129
4 Claims. (Cl. 340—147)

This invention relates in general to data processing systems having remote inquiry stations and in particular to an improved remote inquiry station employing an electronic list finder.

In various data processing systems it is desirable to employ a number of remote inquiry stations which are capable of communicating with a main memory of the data processing system. A space reservation system is one instance of a data processing system where remote inquiry stations are desirable. In such systems certain data is usually stored locally, while data affecting the overall system is stored at a central location. For example, in handling airline reservations remote input units may contain schedules of all flights departing from and arriving at their respective cities, while the availability of these flights is maintained at a central unit and is available upon request to each of the remote units.

In known remote inquiry stations locally stored flight schedule information is usually presented by means of an optical viewing arrangement employing either a microfilm matrix or a tape film having a series of frames each corresponding to a different local schedule. The disadvantage of such an arrangement for local storage of information is in updating a schedule when a change occurs. With optical arrangements updating of a single schedule requires the replacement of the entire film or tape, and hence considerable time and effort are required in keeping the locally stored information up to date.

With remote inquiry stations it is also desirable to make the inquiry procedure with the central unit as simple as possible in order to insure that the correct address is obtained in the central processing unit.

It has been found in accordance with the present invention that a remote inquiry station may be provided wherein locally stored information is readily updated and communication with the central processing unit is greatly simplified. The present invention, as employed in connection with remote inquiry stations, comprises a looseleaf type binder having a plurality of replaceable pages which are arranged with offset tab portions selectively engageable by a manually operated page selector, the page selector being additionally provided with means for selectively operating a circuit closure corresponding to the selected page, to provide a signal to the central unit indicative of the page selected. With such an arrangement the problem of updating is simplified in that a single schedule change may be made quite simply or, where a number of changes are involved, a single sheet may be replaced.

It is therefore an object of the present invention to provide an improved unit for remote inquiry to a central processing unit.

Another object of the present invention is to provide a unit for integrating information stored locally at a remote inquiry station into a central data processing system.

A further object of the present invention is to provide means for automatically indicating at a remote point the page selected by a manually operated page selection device.

A still further object of the present invention is to provide circuit closure means which are operated by a manually movable page selector associated with a looseleaf book for establishing at least one circuit indicative of the page selected.

A still further object of the present invention is to provide an electronic list finder.

Other objects of the invention will be pointed out in the following description and claims and illustrated in the accompanying drawings which disclose, by way of example, the principle of the invention and the best mode which has been contemplated of applying that principle.

Figures 1, 2, 3, 4:
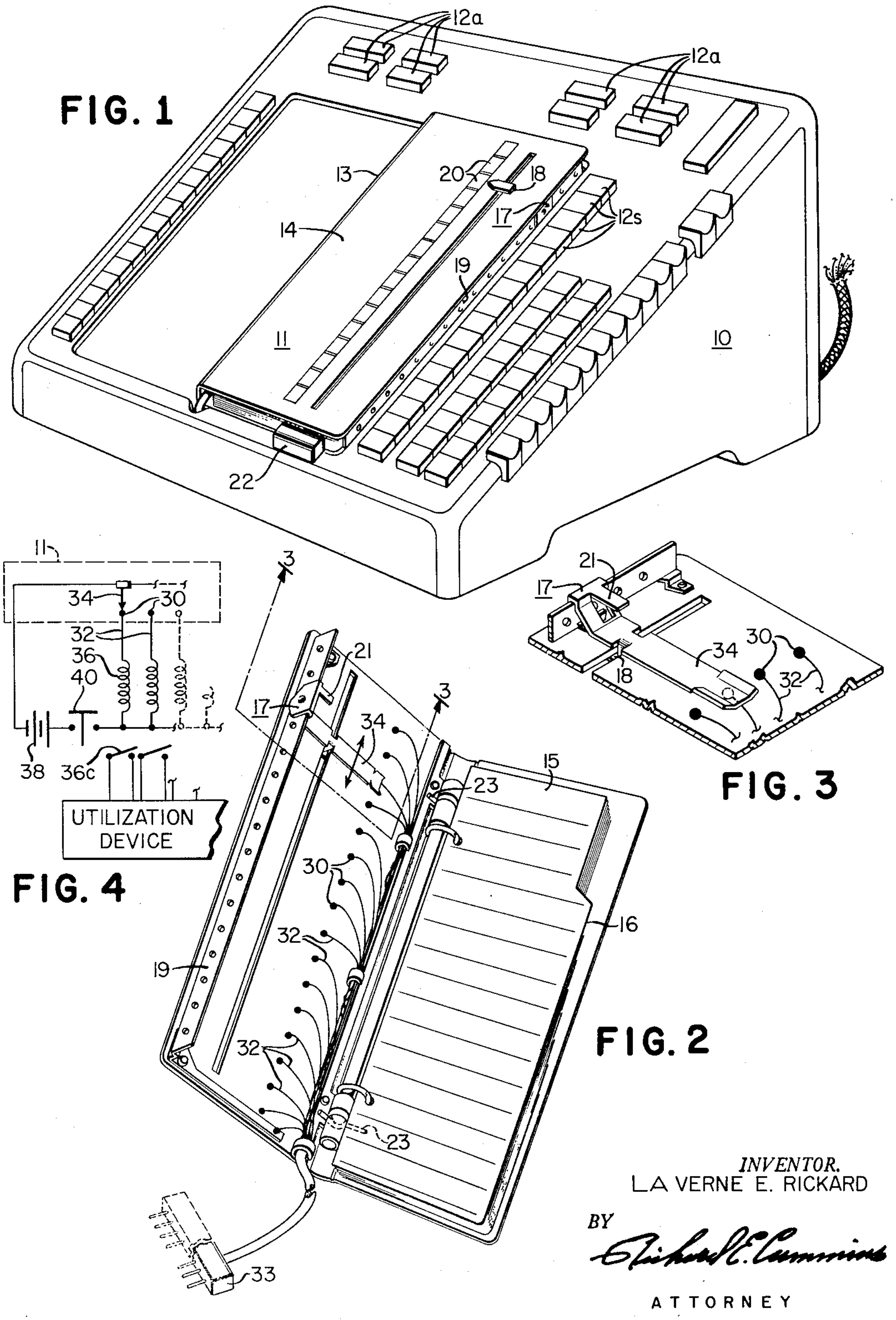
FIG. 1 is a perspective view illustrating a remote inquiry station embodying the present invention.
FIG. 2 is a perspective view illustrating the list finder shown in FIG. 1 in an open position, with certain looseleaf pages omitted and the inside of the front cover broken away.
FIG. 3 is a sectional view taken along the line 3—3 of FIG. 2.
FIG. 4 is a schematic illustration of the circuits employed in the list finder shown in FIG. 1.

Referring to the drawing and particularly to FIG. 1, the remote inquiry station as shown therein comprises a console type structure 10 having a list finding device 11, a plurality of selection keys 12S and a plurality of action keys 12A. The list finder 11 comprises a looseleaf type book 13 provided with a cover 14 and a number of replaceable sheets or pages 15 containing locally stored flight information. The sheets are progressively cut away along their free edges 16 to provide a succession of projecting portions. A page selecting mechanism 17 is mounted on the front cover adjacent a page index list 20 corresponding to the pages contained in the looseleaf book. The page selecting mechanism 17 includes a selector 18 mounted for sliding movement along a track 19 so as to position selector 18 relative to one line of the list 20. A tab portion 21 of the selecting mechanism 17 is arranged to engage with a selected page 15. A spring release latch 22 may also be provided which, when pressed, causes the cover 14 of the list finder 11 to be opened by means of spring 23 and present the selected page 15.

These devices per se are well known in the art, the telephone list finder employed in most present day offices being a good example of a device which functions mechanically in an analogous manner.

In accordance with the teaching of the present invention, the information stored in the list finder is integrated into a data processing system by providing a series of contacts 30 which are positioned relative to the selecting mechanism 17 so that a different contact 30 is closed for each page selecting position of the selector 18 by means of a wiper arm 34 which is mounted for movement with the selector 18. The page selecting mechanism 17 therefore performs a dual function of selecting the correct page 15 and providing an electrical indication of the selected page which may be employed at a distant point. As shown in FIGS. 2 and 3, a row of contacts 30 are arranged parallel to the direction of movement of the page selector 18, a lead 32 extending from each contact 30 to a suitable multi-terminal plug 33 which may be connected, for example, to the coils of a corresponding number of relays 36. The relays, in turn, may control contacts **36*c*** in a suitable utilization device, shown diagrammatically in block form in FIG. 4 in that it forms no part of the present invention. The utilization device in the illustrated embodiment may take the form of a code translator for sending a binary coded signal to the central processing unit.

As shown schematically in FIG. 4, a page indicating signal may be generated by the wiper arm 34 of the page selecting mechanism actually engaging one of the contacts 30. In this instance, wiper arm 34 of the page selecting mechanism 17 engages each contact 30 as it is moved from one page selecting position to another. A circuit is established from a source of voltage represented by battery 38 through the track 19, wiper arm 34, contact 30, line 32, coil of relay 36 and then to the positive terminal of battery 38. As shown in FIG. 4, additional contact means comprising a start contact 40 may also be provided in the above described circuit. Contact 40 may be closed in response to actuation of the release latch 22 which opens the book 13.

Assuming an operator desires to inquire about the availability of a particular flight, the book 13 being in the closed position, the page selector 18 is moved manually to a position opposite the city as listed in the index 20. The portion 21 of the page selecting mechanism 17 is then in position to open the book to the correct page 15 when the release latch 22 is actuated. In addition, the contact 30 corresponding to the selected city or page has been engaged by wiper arm 34 and the circuit is established. Upon actuation of the release latch 22, contact 40 is closed and a signal is sent to the utilization device indicating a transaction relative to flights on the selected page is to begin. This signal may be used as part of an address for directing an access mechanism of a memory associated with the centrally stored information.

Additional parts of the address may be obtained in any suitable manner such as by specific flight selection keys 12S which are disposed opposite the list of flights when the book is completely open.

It will, of course, be obvious that other known types of circuit closures or controllers may be substituted for the stationary contact and wiper arrangement shown in the illustrated embodiment. Likewise, known contact arrangements for providing a series of signals may also be employed if desired.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A remote input unit for a data processing system comprising, in combination, a book having pages containing information relating to the data being processed, said book including a cover having an automatic page selecting mechanism operatively associated therewith, said selecting mechanism including a page selector mounted for movement to predetermined positions corresponding to said pages, and means for providing page indicating signals to said system comprising a plurality of circuit closures mounted on said cover at locations corresponding to said predetermined positions, a plurality of energizable circuits connected respectively between said closures and said system, and means mounted for movement with said page selector for operating said circuit closures in accordance with the page selected.

2. A remote input unit for a data processing system comprising, in combination, a book having pages containing information relating to the data being processed, said book including a cover having an automatic page selecting mechanism operatively associated therewith, said selecting mechanism including a page selector mounted for movement to predetermined positions corresponding to said pages, and means for providing page indicating signals to said system comprising a plurality of stationary contacts mounted on said cover at locations corresponding to said predetermined positions, a plurality of energizable circuits connected respectively from said stationary contacts to said system, a movable wiper contact, and means for mounting said wiper contact for movement with said page selector for engagement with said stationary contacts to enable the completion of each said energizable circuit.

3. The invention recited in claim 2 further including a start contact for completing the circuit enabled by said wiper contact.

4. The invention recited in claim 3 further including spring means operable to open said cover, a latch operable in one position to maintain said cover closed and operable in another position to simultaneously close said start contact and render said spring means operable.

References Cited in the file of this patent

UNITED STATES PATENTS

| | | |
|---|---|---|
| 1,932,909 | Pollard et al. | Oct. 31, 1933 |
| 2,115,537 | Peter | Apr. 26, 1938 |
| 2,186,436 | Shaler | Jan. 9, 1940 |
| 2,341,983 | Faas | Feb. 15, 1944 |
| 2,576,892 | Stanton | Nov. 27, 1951 |

FOREIGN PATENTS

| | | |
|---|---|---|
| 835,073 | Germany | Mar. 27, 1952 |